April 30, 1963    K. E. A. GÖTHBERG    3,087,762
CAGE FOR CYLINDRICAL ROLLER BEARINGS
Filed June 16, 1960    2 Sheets-Sheet 1

INVENTOR:
KARL EVALD ANDREAS GÖTHBERG
BY Howson & Howson
ATTYS.

United States Patent Office 3,087,762
Patented Apr. 30, 1963

3,087,762
CAGE FOR CYLINDRICAL ROLLER BEARINGS
Karl Evald Andreas Göthberg, Backasen, Lerum, Sweden, assignor to Aktiebolaget Svenska Kullagerfabriken, Goteborg, Sweden, a corporation of Sweden
Filed June 16, 1960, Ser. No. 36,605
7 Claims. (Cl. 308—217)

The present invention relates to improvements in cages or cylindrical roller bearings comprising at least two preferably similar annular portions having roller separating round pins interconnecting them. In known cages of this type the ends of the pins are of reduced diameter relative to the diameter of the remainder of the pin. These reduced diameter portions are riveted to the annular portions. Cages having a great number of rollers and thin roller separating pins will, however, not be sufficiently rigid. In order that the pins of the finished cage may be parallel with the axis of the bearing and with each other it is necessary not only that the holes in the annular portions for the reduced portions are exactly located, but also that the surfaces of the reduced portions and the remainder of the pins respectively are co-axial. This requirement is met in the present invention thereby that the diameter of the ends of the pins is the same as that of the remainder of the pin. This results in the following advantages: The pins will be cheap to manufacture since they can be centerless ground along their whole lengths. Their tolerances can be held within narrow limits and the risk of skewing will be small. The cage can be made with great precision at a low price, i.e. the pins will be parallel with each other, which is of prime importance for accurate running of the bearing. No special tools or expensive fixtures are required for the various forms or sizes and new sizes can therefore very quickly be put into production.

An advantage of making the pins of round section is that the lubrication between the rollers and the pins will be very good. The oil film has no tendency to rupture since the oil is so to speak rolled in between the two cylindrical surfaces of the roller and pin respectively. In order further to improve the lubrication the pins may be made with at least as fine surface finish as the rollers and, if desired, also of the same hardness in order to avoid wear on the pins.

The invention is described in the following with reference to the accompanying drawings which illustrate various forms of cages according to the invention. Figures with the suffix "a" (FIGS. 1a, 2a, etc.) show side views or sections transverse to the bearing axis of portions of bearings and corresponding figures with "b" (FIGS. 1b, 2b, etc.) show sections along the lines indicated in the corresponding "a" figure.

Figure 1A:
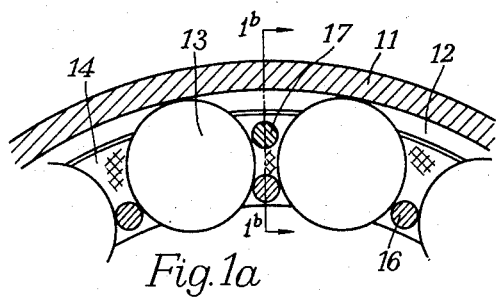
Figure 1B:
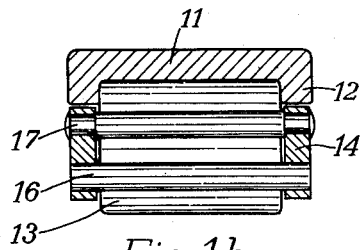

In FIGS. 1a and 1b the numeral 11 indicates the outer race ring of a cylindrical roller bearing having fixed flanges 12. The rollers 13 are separated from each other by a cage which comprises a pair of annular portions, rings 14, at the ends of the rollers, the outer cylindrical surfaces of which slide against the flanges 12 and thus center the cage. The rings 14 are provided with holes into which round pins 16 are pressed. These pins are made of a material at least as hard as that of the rollers and their finish is of a quality at least as good as the rollers. The rings are interconnected by these pins 16, but as an additional aid against relative displacement of the rings shouldered rivets may be provided if required to hold the rings together.

In the form of the invention illustrated in FIGS. 1a and 1b, i.e. in bearings having flangeless inner race rings, the cages are assembled within the outer race ring. The pins 16 are located inside of the pitch circle of the rollers and the distance between two adjacent pins is less than the diameter of the rollers. The rollers are thus prevented from falling out of their pockets when the inner ring is removed.

Figure 2A:
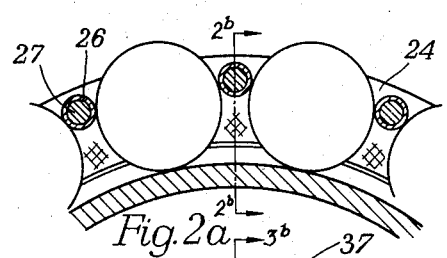
Figure 2B:
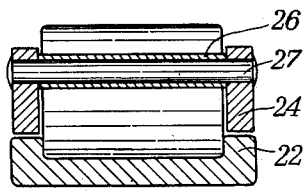

The form of the invention shown in FIGS. 2a and 2b differs from that described above in that the cage is centered on the inner race ring, i.e. the inner cylindrical surface of the rings 24 ride on the flanges 22 of the inner race ring. In this case the roller separating members are located outside of the pitch circle of the roller set and are shown as each comprising a tube 26 which surrounds a rivet 27 of softer material to hold the cage together. This cage also forms a self-contained unit after assembly with the inner race ring and the rollers.

Figure 3A:
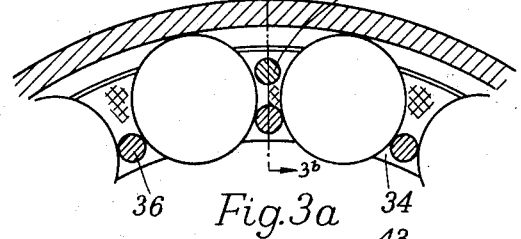
Figure 3B:
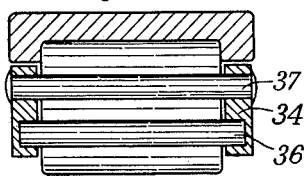

In the form of the invention shown in FIGS. 3a and 3b the cage rings 34 are provided with blind holes which fit the pins 36. The rings may preferably be made of a sintered metal and are held together by rivets 37.

Figure 6A:
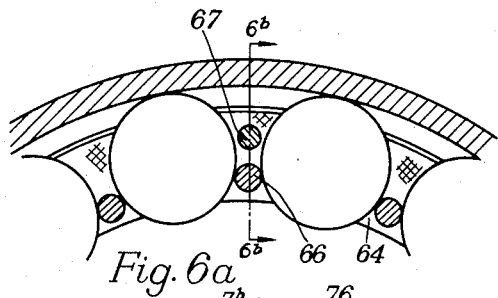
Figure 6B:
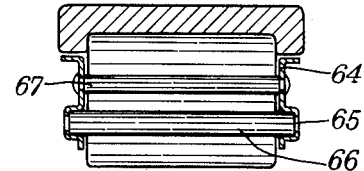

The cage rings may be made of sheet metal stamped and shaped to suitable form. A cage of this kind is shown in FIGS. 6a and 6b. Holes with flanged edges are provided in the cage rings 64. The outer openings 65 of the holes are somewhat smaller than the cylindrical hole in the flange, whereby the end of the pin is prevented from passing through the hole. The cage is held together by rivets in the manner described above.

Figure 8A:
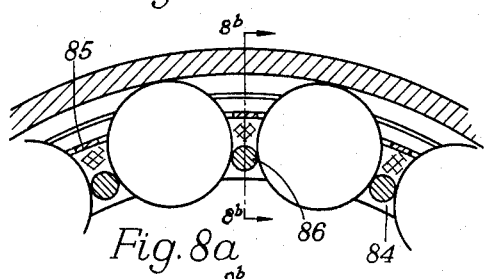
Figure 8B:
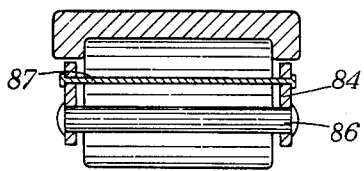

In the form shown in FIGS. 8a and 8b the distance pieces between the cage rings 84 consist of a cylinder 17 of sheet metal in which pockets and tongues 85 have been formed, the latter fitting holes in the cage rings 84. The ends of the pins 86 are heated and riveted. The pockets and the cross pieces are dimensioned so that the cylindrical surfaces of the rollers engage only the pins 86 but are free from engagement with the edges of the pockets.

Figure 9A:
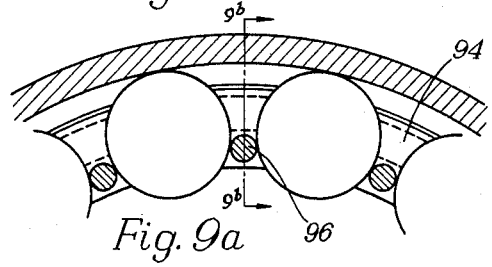
Figure 9B:
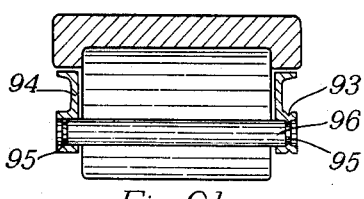

In the cage according to FIGS. 9a and 9b the pins 96 are provided at their end portions with annular grooves 95. The pins are locked in place axially thereby that the material surrounding the pin is pressed into these grooves at one or more places 93. The left hand side of FIG. 9b shows the cage ring 94 before and the right hand side after this operation.

Figure 4A:
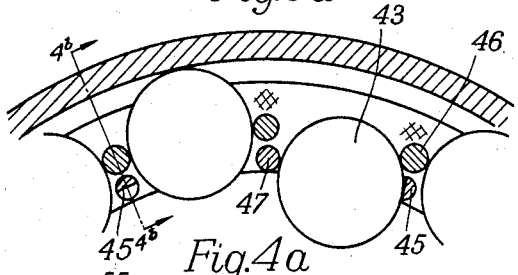
Figure 4B:
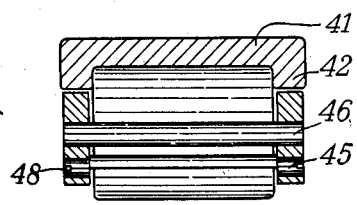

In all of the forms of the invention the cage must be assembled in position in the bearing. FIGS. 4a and 4b, 5a and 5b and 7a and 7b show three forms of cages which can be assembled before introduction into the bearing. In the first-mentioned form the pins 46 are located about at the pitch circle of the rollers or outside thereof. The rollers would thus be able to fall out of the bearing when the inner race ring is removed. To prevent this, rivets 47 are provided inwards of alternate pins and especially shaped pins 45 are provided inwards of the remainder, these having in at least one end diametrical grooves 48 which can be made deep enough to make the end of the pin resilient thereby to prevent it from turning when not desired. Part of the material of the pin 45 is removed whereby the pin is beveled along a portion of its length to a degree to enable a roller 43 to pass when the pin is turned to a certain position as shown in FIG. 4a. The roller is then locked in position by turning the pin 45 about ¼ of a revolution by means of a suitable tool inserted in the groove 48. When it is desired to inspect the bearing the inner race ring is first removed after which individual rollers may be removed for inspection or replacement.

In a modification of this form the pins 46 are eliminated and the pins 45 and rivets 47 serve as roller separating pins located somewhat inside of the pitch circle of the roller set. The pins are prevented from turning in some suitable manner, for instance by deforming the surrounding material with a center punch or by a ring of wire fitting into the grooves in the ends of the pins which project somewhat beyond one of the rings.

Figure 5A:
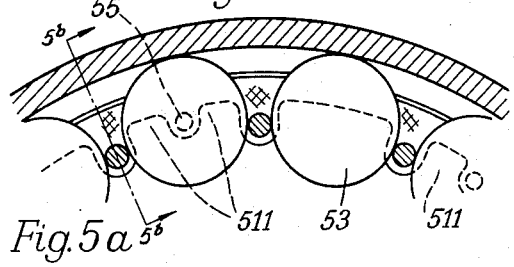
Figure 5B:
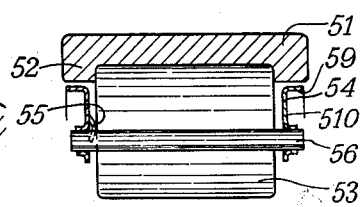

FIGS. 5a and 5b show a cage the rings 54 of which are made of sheet metal and have L-shaped cross section, i.e. they have a cylindrical portion 59 and a substantially plane annular portion 510. The cylindrical portion 59 slides on the flanges 51 and 52 of the outer race ring and the plane portion is provided with flanged holes into which the pins 56 are pressed, the material being cut out at both sides of the pins as indicated by the numeral 511. The portions of the cage which surround the pins 56 will thus be somewhat resilient and the rollers 53 can be snapped in between two adjacent pins 56. The cage rings 54 are also provided with projecting resilient pressure members 55 at the ends of alternate rollers, and similar members are provided on the other cage ring to act upon the other rollers in the opposite direction. The cage thus presses every other roller against one of the flanges and the others against the other flange. The pins are prevented from turning by a suitable adhesive or by welding.

Figure 7A:
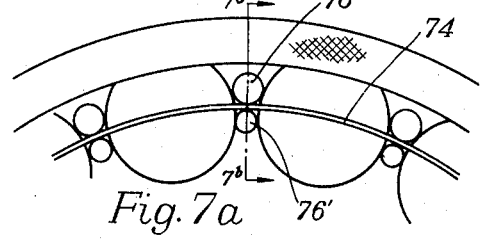
Figure 7B:
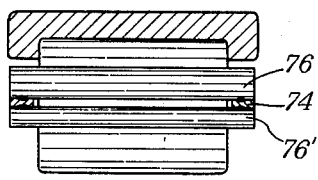

In all of the forms of the invention shown the cage is centered by one of the rings. There is, however, nothing to prevent it from being centered by the rollers. A cage of this kind is shown in FIGS. 7a and 7b. In this case the cage rings 74 are made of wire or strip and are connected to each other by hardened pins 76 and 76′ of different diameters. The pins are arranged in pairs, the larger pins 76 being located towards the outer diameter of the rings 74 and the smaller pins at their inside, the distance between adjacent outer pins and adjacent inner pins respectively being somewhat less than the roller diameter. Since the cross section of the rings 74 is small a roller can be inserted into place either inwards between a pair of pins 76 or outwards between a pair of pins 76′ by elastically flexing the rings 74 between the pins 76 and 76′ respectively. The pins may be welded to the rings, the current being confined to the ends of the pins so that the hardness of the other portions of the pins will not be affected.

By making certain changes in the form shown in 1a and 1b the cage can be altered so that it forms a self-contained unit together with the rollers which can be assembled outside of the bearing. In this case the pins are located outwards of the roller pitch circle and rivets are provided between each pair of rollers so far inside the pitch circle that the rollers may be displaced sufficiently far towards the center to be able to pass the flanges.

The invention may also be applied to multirow roller bearings in which case a cage ring is applied between two adjacent rows of rollers. The round pins may be made of various materials and surface treated in various ways. In addition to steel treated in different ways for instance case hardened, induction hardened, ground, burnished or polished the pins may also be made from other hard metals or metal alloys. Pins of porcelain or ceramic materials may also be used.

I claim:

1. A cage for cylindrical roller bearings comprising a pair of annular portions having radially projecting circumferentially spaced resilient flexible portions, roller engaging and separating pins connecting said annular portions being rigidly secured to said annular portions and mounted in fixed positions between the resilient portions thereof, said pins being circumferentially spaced apart to define pockets for the roller elements, adjacent pins being spaced apart a distance less than the diameter of one of the roller elements, said resilient portions being flexible radially to increase the spacing between adjacent pins to permit insertion of the roller elements into the pockets.

2. A cage for cylindrical roller bearings comprising at least two annular portions, roller engaging and separating pins mounted in fixed positions between the annular portions and spaced apart circumferentially to provide pockets for the rollers, said pins being of a substantially uniform cross section throughout their length and the finish and hardness of the pins being substantially the same as that of the rollers, and roller retaining members in said cage which cooperate with said retaining pins to retain the rollers against movement radially of the annular portions, said roller retaining members being disposed between adjacent rollers and every other roller retaining member consisting of a rivet and every other one of a turnable pin having at least at one end a diametrically extending groove and being beveled along a portion of its length to a degree whereby the opening between a pin and adjacent rivet will be greater in one position of rotation of the pin than the roller diameter.

3. A cage according to claim 2 wherein the turnable pins and rivets serve as roller separating pins, the said pin being capable of being locked against turning.

4. A cage for cylindrical roller bearings comprising at least two annular portions, roller engaging and separating pins mounted in fixed positions between the annular portions and spaced apart circumferentially to provide pockets for the rollers, said pins being of a substantially uniform cross section throughout their length and the finish and hardness of the pins being substantially the same as that of the rollers, and means defining annular grooves in the ends of the pins, the material of the annular portions surrounding the ends of the pins being pressed into said grooves at one or more places.

5. A cage for cylindrical roller bearings comprising at least two annular portions, roller engaging and separating pins mounted in fixed positions between the annular portions and spaced apart circumferentially to provide pockets for the rollers, said pins being of a substantially uniform cross section throughout their length and the finish and hardness of the pins being substantially the same as that of the rollers, said annular portions being made of rings of sheet metal and being plane in cross section, and means defining flanged holes in said rings for fixing said pins therein.

6. A cage for cylindrical roller bearings comprising at least two annular portions, roller engaging and separating pins mounted in fixed positions between the annular portions and spaced apart circumferentially to provide pockets for the rollers, said pins being of a substantially uniform cross section throughout their length and the finish and hardness of the pins being substantially the same as that of the rollers, said annular portions being made of rings of sheet metal and being profiled in cross section, and means defining flanged holes in said rings for fixing said pins therein.

7. A cage for cylindrical roller bearings comprising at least two annular portions, roller engaging and separating pins mounted in fixed positions between the annular portions and spaced apart circumferentially to provide pockets for the rollers, said pins being of a substantially uniform cross section throughout their length and the finish and hardness of the pins being substantially the same as that of the rollers and resilient pressure members projecting from at least one of the annular portions, each of said pressure members being aligned with one of the rollers and operable to engage the axial end face thereof to retain the rollers in the pockets.

(References on following page)

References Cited in the file of this patent

UNITED STATES PATENTS

| | | |
|---|---|---|
| 400,053 | Chaplin | Mar. 26, 1889 |
| 686,403 | Henderson | Nov. 12, 1901 |
| 718,122 | Henderson | Jan. 13, 1903 |
| 738,808 | Hutchison | Sept. 15, 1903 |
| 943,128 | Vanmanen | Dec. 14, 1909 |
| 1,367,006 | Baumler | Feb. 1, 1921 |
| 1,454,785 | Griffith | May 8, 1923 |
| 1,458,954 | Rouanet | June 19, 1923 |
| 1,466,689 | Bower | Sept. 4, 1923 |
| 2,569,531 | Kunzog | Oct. 2, 1951 |